US009912838B2

United States Patent
Park

(10) Patent No.: US 9,912,838 B2
(45) Date of Patent: Mar. 6, 2018

(54) VIDEO SURVEILLANCE SYSTEM FOR PREVENTING EXPOSURE OF UNINTERESTING OBJECT

(71) Applicant: ITX-M2M Co., Ltd., Seoul (KR)

(72) Inventor: Dong Uk Park, Gwangmyeong-si (KR)

(73) Assignee: ITX-M2M CO., LTD., Seoul (KR)

( * ) Notice: Subject to any disclaimer, the term of this patent is extended or adjusted under 35 U.S.C. 154(b) by 24 days.

(21) Appl. No.: 15/182,688

(22) Filed: Jun. 15, 2016

(65) Prior Publication Data

US 2017/0054902 A1 Feb. 23, 2017

(30) Foreign Application Priority Data

Aug. 17, 2015 (KR) ........................ 10-2015-0115461

(51) Int. Cl.
*H04N 5/247* (2006.01)
*G06K 9/00* (2006.01)
*G06K 9/32* (2006.01)
*H04N 1/44* (2006.01)
*G06K 9/20* (2006.01)

(52) U.S. Cl.
CPC ........... *H04N 1/448* (2013.01); *G06K 9/2063* (2013.01); *H04N 5/247* (2013.01); *G06K 9/00771* (2013.01); *G06K 9/3233* (2013.01)

(58) Field of Classification Search
None
See application file for complete search history.

(56) References Cited

U.S. PATENT DOCUMENTS

| | | | |
|---|---|---|---|
| 2004/0130620 A1* | 7/2004 | Buehler | G06K 9/00335 348/143 |
| 2005/0129272 A1* | 6/2005 | Rottman | G06K 9/00228 382/103 |
| 2006/0137018 A1* | 6/2006 | Herschaft | H04N 5/76 726/26 |
| 2007/0153091 A1* | 7/2007 | Watlington | H04N 7/15 348/208.14 |
| 2011/0096922 A1* | 4/2011 | Oya | H04N 7/183 380/28 |
| 2011/0150327 A1* | 6/2011 | Yoo | G06T 1/00 382/165 |
| 2012/0039506 A1* | 2/2012 | Sturzel | G06F 17/30781 382/103 |
| 2013/0156185 A1* | 6/2013 | Kim | H04N 5/913 380/210 |
| 2013/0208124 A1* | 8/2013 | Boghossian | H04N 7/181 348/159 |

(Continued)

FOREIGN PATENT DOCUMENTS

| | | |
|---|---|---|
| JP | 2008-17093 A | 1/2008 |
| KR | 10-2007-0009918 A | 1/2007 |
| KR | 10-2015-0056381 A | 5/2015 |

OTHER PUBLICATIONS

Korean Office Action dated Aug. 17, 2015 in counterpart Korean Application No. 10-2015-0115461 (6 pages in Korean).

*Primary Examiner* — Shahbaz Nazrul
(74) *Attorney, Agent, or Firm* — NSIP Law

(57) ABSTRACT

The present invention discloses a video surveillance system for preventing exposure of uninteresting objects, which is achieved by making the uninteresting objects, excluding an object of interest, in a video captured by an IP camera indistinguishable, so that their personal information may be protected.

5 Claims, 2 Drawing Sheets

(56) References Cited

U.S. PATENT DOCUMENTS

| | | | | |
|---|---|---|---|---|
| 2014/0300758 A1* | 10/2014 | Tran | ...................... | H04N 5/225 348/207.1 |
| 2014/0333776 A1* | 11/2014 | Dedeoglu | .............. | H04N 7/181 348/159 |
| 2015/0055775 A1* | 2/2015 | Choi, II | ................ | H04L 9/0894 380/28 |
| 2017/0076572 A1* | 3/2017 | Rao | .................... | G06K 9/00771 |

* cited by examiner

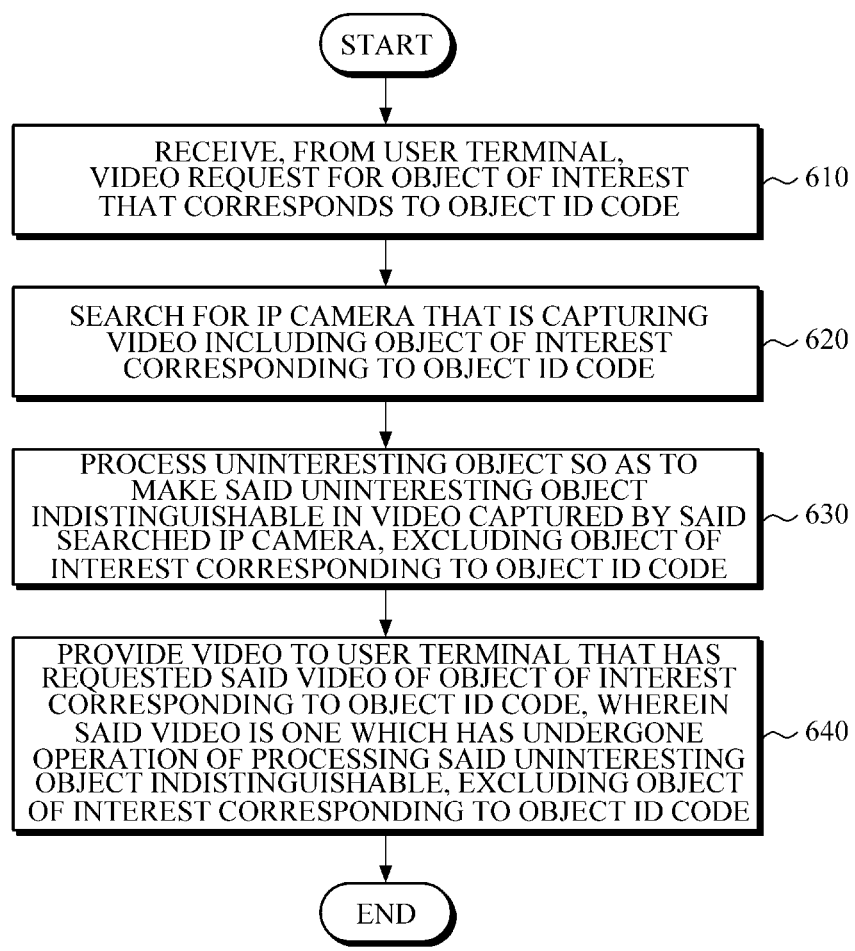

VIDEO SURVEILLANCE SYSTEM FOR PREVENTING EXPOSURE OF UNINTERESTING OBJECT

CROSS-REFERENCE TO RELATED APPLICATION(S)

This application claims the benefit under 35 U.S.C. § 119(a) of Korean Patent Application No. 10-2015-0115461, filed on Aug. 17, 2015, in the Korean Intellectual Property Office, the entire disclosure of which is incorporated herein by reference for all purposes.

BACKGROUND

1. Field

The following description relates to a video surveillance technology, and more particularly, to a video surveillance system for preventing the exposure of an uninteresting object.

2. Description of the Related Art

Korean Publication Patent No. 10-2007-0009918 (Jan. 19, 2007) proposes a technology for pixelating a specific part of an image.

The present invention proposes a technology that excludes objects of interest and that makes distinctions of only the uninteresting objects impossible in a video captured by an IP camera, thus preventing exposure of uninteresting objects so that their personal information is protected.

SUMMARY

The purpose of the following description is to provide a video surveillance system for preventing exposure, excluding an object of interest, of uninteresting objects in a video captured by an IP camera, by making said uninteresting objects impossible to distinguish.

In one general aspect, a video surveillance system includes: a video receiver to receive and store a video captured by at least one IP camera; a video request receiver to receive, from a user terminal, a video request of an object of interest that corresponds to an object ID code; a camera searcher to search for an IP camera that is capturing a video that includes the object of interest; a video processor to process uninteresting objects, excluding the object of interest, in the video captured by the searched IP camera so as to make the uninteresting objects indistinguishable; and a video provider to provide the video, which has undergone processing by the video processor, to the user terminal that has requested the video.

The video processor may detect a location of the object of interest, and process the uninteresting objects so as to make the uninteresting objects indistinguishable in the video, which exist in other locations excluding the detected location of the object of interest.

The video receiver may further receive the object ID code from the IP camera, along with the location of the object of interest corresponding to the object ID code.

The object ID code and the location of the object of interest corresponding to the object ID code may be transmitted by an object ID code transmitter that is installed in the object of interest.

The IP camera may acquire the object ID code, along with the location of the object of interest corresponding to the object ID code, via an internal or external object ID code receiver that receives the object ID code and the location corresponding to the object ID code, which have been transmitted by the object ID code transmitter.

The object ID code transmitter may be a wearable device or a beacon signal transmitter, which transmits a beacon signal.

The video processor may pixelate or blur the uninteresting objects so as to make the uninteresting objects indistinguishable.

Other features and aspects may be apparent from the following detailed description, the drawings, and the claims.

BRIEF DESCRIPTION OF THE DRAWINGS

FIG. 2 is a flowchart illustrating an example of a video processing operation of a video surveillance system for preventing exposure of an uninteresting object according to an exemplary embodiment.

Figure 1:
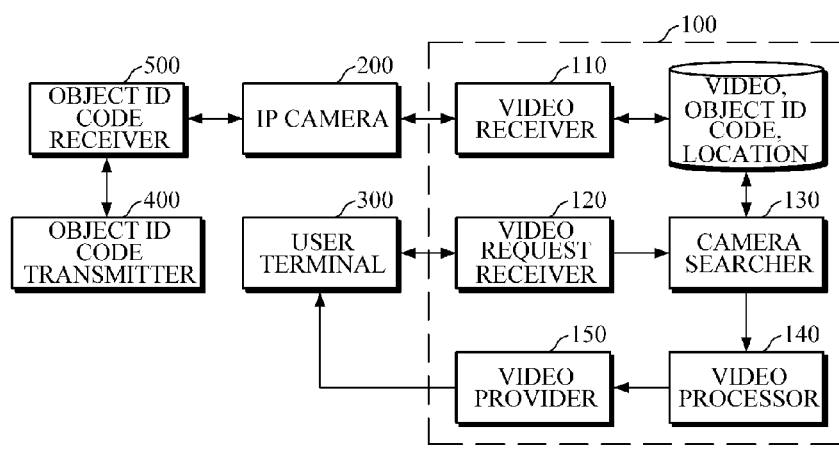
FIG. 1 is a diagram illustrating an example of a video surveillance system for preventing exposure of an uninteresting object according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses, and/or methods described herein will be suggested themselves to those of ordinary skill in the art. Also, descriptions of well-known functions and structures may be omitted to enhance clarity and conciseness.

FIG. 1 is a diagram illustrating an example of a video surveillance system for preventing exposure of an uninteresting object according to an exemplary embodiment. Referring to FIG. 1, a video surveillance system 100 for preventing exposure of an uninteresting object includes a video receiver 110, a video request receiver 120, a camera searcher 130, a video processor 140, and a video provider 150.

The video receiver 110 receives and stores a video captured by at least one IP camera 200. Here, the video receiver 110 may be configured to further receive, from the IP camera 200, an object identification (ID) code and a location of the object of interest that corresponds to the object ID code. The location of the object of interest may be acquired based on the Global Positioning System (GPS).

The object ID code and the location may be transmitted from an object ID code transmitter 400 that is installed on the object of interest. For example, the object ID code transmitter 400 may be a beacon signal transmitter, which transmits a beacon signal, or a wearable device.

The IP camera 200 may be configured to acquire an object ID code and a location of the object of interest that corresponds to the object ID code through an internal or external object ID code receiver 500, which receives the object ID code, received from the object ID code transmitter 400, and the location of the object of interest corresponding to the object ID code.

For example, if the object of interest is an infant, who is wearing around its neck an object ID code transmitter 400 in the form of a necklace, the object ID code receiver 500, which is equipped in an IP camera 200 installed in preschool, may be configured to receive the object ID code along with the location of the object of interest (i.e., the infant), which are transmitted by the object ID code transmitter 400 that is worn around the infant's neck.

The video request receiver 120 receives, from a user terminal 300, a video request of the object of interest that corresponds to the object ID code. Here, the video request receiver 120 may be configured to provide, to the user terminal 300, a user interface for inputting the object ID code, through which the object ID code is input.

For example, when a parent wants to check whether a child (i.e., an object of interest) is safe and sound at preschool, the parent may access the system through a user terminal 300 (e.g., a smartphone) and input the object ID code of their child through the user interface that is provided by the video request receiver 120, thereby performing a video request on the object of interest. Here, the child's object ID code, input by the parent, is required to be the same as the object ID code that is transmitted by the object ID code transmitter 400 worn around the child's neck.

The camera searcher 130 searches for an IP camera that is capturing a video that includes an object of interest corresponding to the object ID code. If a plurality of IP cameras exists in many places, by which IP camera the video including the object of interest corresponding to the object ID code is captured and transmitted.

If the object ID code and the location of the object of interest that corresponds to the object ID code are received, the IP camera transmits the object ID code and said location, along with the video being captured. The camera searcher 130 detects an IP camera transmitting an object ID code that is the same as one input by the user terminal 300, thereby checking the IP camera capturing the video including the object of interest that corresponds to the object ID code.

The video processor 140 takes the video captured by the IP camera that the camera searcher 130 has searched through, and therefrom, processes the uninteresting objects, excluding the object of interest, so that said uninteresting objects in the video captured by said camera are impossible to distinguish.

Here, the video processor 140 may be configured to detect from said video the location of the object of interest that corresponds to the object ID code, and to process the uninteresting objects by making said uninteresting objects, which exist in other locations excluded from the location of the detected object of interest, impossible to distinguish.

For example, the video processor 140 can make uninteresting objects in a captured video indistinguishable by pixelating or blurring said uninteresting objects. The video processor 140 may also incorporate other various image processing techniques (e.g., converting to black and white) to process the uninteresting objects so as to make them indistinguishable.

Extracting both the object of interest and the uninteresting objects from the captured video may be performed using a method of extracting an object's features, and the like. Said extraction method is within the realm of public knowledge and has been so prior to the filing of the present application, and therefore a detailed description is omitted.

In a case concerning a video captured by an IP camera 200 installed in a preschool, the video processor 140 may process uninteresting objects excluding an object of interest (i.e., a child) by pixelating or blurring said uninteresting objects (i.e., other people or things) and thus make them impossible to distinguish.

The video provider 150 provides a video to a user terminal 300 that has requested the video of the object of interest corresponding to the object ID code, wherein said video is one that has undergone processing by the video processor 140—the processing being that the uninteresting objects, excluding the object of interest that corresponds to the object ID code, have been made impossible to distinguish.

For example, a parent can watch said video through a user terminal 300 (e.g., a smartphone they own), wherein said video is acquired by having pixelated or blurred the uninteresting objects (i.e., other people or things), excluding the object of interest (i.e., their child) that corresponds to the object ID code, and thus making said uninteresting objects indistinguishable.

Through the above-mentioned operations, the present disclosure may prevent the exposure of uninteresting objects, excluding an object of interest, in a video captured by an IP camera by making said uninteresting objects impossible to distinguish, thus protecting any personal information regarding the uninteresting object, excluding the object of interest.

FIG. 2 illustrates a video processing operation in a video surveillance system for preventing exposure of an object of interest, as described above. FIG. 2 is a flowchart illustrating an example of a video processing operation of a video surveillance system for preventing exposure of an uninteresting object according to an exemplary embodiment.

At a time when a video surveillance system is receiving and storing a real-time video feed from a single IP camera, the video surveillance system receives, from a user terminal, a video request for an object of interest corresponding to an object ID code as illustrated in operation 610.

Next, as illustrated in operation 620, the video surveillance system searches for an IP camera that is capturing a video including the object of interest corresponding to the object ID code.

Then, as illustrated in operation 630, the video surveillance system processes the video captured by the IP camera that has undergone operation 620, whereby uninteresting objects in the video are made indistinguishable, while the object of interest corresponding to the object ID code is excluded.

Here, the video processor 140 may pixelate or blur the uninteresting objects to thus make them impossible to distinguish.

Lastly, in operation 640, the video surveillance system provides a video to a user terminal that has requested the video of the object of interest corresponding to the object ID code, wherein said video is the one which has undergone operation 630 of processing the video so as to make the uninteresting objects in the captured video impossible to distinguish, while the object of interest that corresponds to the object ID code is excluded from this processing.

Through the above-mentioned operations, the present disclosure may prevent the exposure of uninteresting objects, excluding an object of interest, in a video captured by an IP camera by making said uninteresting objects impossible to distinguish, thus protecting any personal information regarding the uninteresting object, excluding the object of interest. Accordingly, the purpose of the present disclosure, as described above, may be achieved.

The present invention discloses an example of how to make an object of interest distinguishable while making uninteresting objects indistinguishable, or vice versa.

The present invention is one which prevents exposure of uninteresting objects in a video being captured by an IP camera by making said uninteresting objects indistinguishable, and thus protects personal information of said uninteresting objects excluding an object of interest.

The present invention may be used for the industrial purposes in the field of video surveillance technology, as well as in various applied areas of said field.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A video surveillance system, comprising:
   a non-volatile memory configured to store a video, an object ID code, and a location of an object of interest corresponding to the object ID code; and
   at least one processor configured to process video stored in the non-volatile memory, the at least one processor comprising
      a video receiving unit configured to receive the video, the object ID code, and the location of the object of interest corresponding to the object ID code from at least one IP camera, and to store the video, the object ID code, and the location of the object of interest corresponding to the object ID code from the at least one IP camera in the non-volatile memory,
      a video request receiving unit configured to receive, from a user terminal, a video request of the object of interest corresponding to the object ID code,
      a camera searching unit configured to search for an IP camera that is capturing the video which is requested by the user terminal,
      a video processing unit configured to process uninteresting objects, excluding the object of interest, in the video which is captured by the searched IP camera so as to make the uninteresting objects indistinguishable, and
      a video providing unit configured to provide the video, which is processed by the video processing unit, to the user terminal which requests the video,
   wherein the object ID code and the location of the object of interest corresponding to the object ID code are transmitted by an object ID code transmitter that is installed in the object of interest.

2. The video surveillance system of claim 1, wherein the video processing unit is further configured to detect the location of the object of interest, and to process the uninteresting objects so as to make the uninteresting objects indistinguishable in the video, and wherein the uninteresting objects exist in other locations excluding the detected location of the object of interest.

3. The video surveillance system of claim 1, wherein the IP camera is configured to acquire the object ID code and the location of the object of interest corresponding to the object ID code, which are transmitted by the object ID code transmitter, via an internal or external object ID code receiver.

4. The video surveillance system of claim 1, wherein the object ID code transmitter comprises a wearable device or a beacon signal transmitter configured to transmit a beacon signal.

5. The video surveillance system of claim 1, wherein the video processing unit is further configured to pixelate or blur the uninteresting objects so as to make the uninteresting objects indistinguishable.

\* \* \* \* \*